United States Patent [19]

Inoue

[11] 3,769,449

[45] Oct. 30, 1973

[54] COLOR VIDEO SIGNAL RECORDING AND REPRODUCING SYSTEM

[75] Inventor: Yuzuru Inoue, Tokyo, Japan

[73] Assignee: Victor Company of Japan, Ltd., Yokohama-City, Kanagawa-ken, Japan

[22] Filed: Jan. 14, 1972

[21] Appl. No.: 217,904

[30] Foreign Application Priority Data

Jan. 16, 1971 Japan .................................... 46/974

[52] U.S. Cl. ............................................ 178/5.4 CD
[51] Int. Cl. ............................................ H04n 9/02
[58] Field of Search .................... 178/5.2 R, 5.4 CD, 178/5.4 SY, 69.5 CB

[56] References Cited

UNITED STATES PATENTS 3,660,596 5/1972 Numakura ........................... 178/5.2

FOREIGN PATENTS OR APPLICATIONS 1,175,660 12/1969 Great Britain................. 178/5.4 SY

*Primary Examiner*—Richard Murray
*Attorney*—Louis Bernat

[57] ABSTRACT

A color video signal recording and reproducing system comprises means for separating a luminance signal and a carrier chrominance signal from a color video signal. The luminance signal is frequency modulated, and the carrier chrominance signal is converted to a lower frequency band. The resulting signals are superimposed and recorded upon a recording medium, for demodulating the frequency modulated luminance signal, and for frequency converting the chrominance signal to its original frequency band, a feedback loop is used. This loop includes a voltage control oscillator operated responsive to means for detecting an error in the running speed of the recording medium. The voltage control oscillator is controlled so that the feedback loop is prevented from being drawn to false stabilizing points which are shifted away from the frequency of the chrominance subcarrier responsive to frequencies which are equl to the frequency of a horizontal synchronizing signal multiplied by an integer.

8 Claims, 4 Drawing Figures

COLOR VIDEO SIGNAL RECORDING AND REPRODUCING SYSTEM

This invention relates to a color video signal recording and reproducing system and, more particularly, to a system which is not locked at a false stabilized point.

In the inventive system, a color video signal recording and reproducing system frequency modulates a luminance signal of the color video signal, frequency converts a carrier chrominance signal, superposes one upon the other, recording, and reproducing the superposed signals. A control loop causes an oscillator to oscillates at a frequency converting signal for converting a reproduced carrier chrominance signal back into a signal having the original frequency.

Generally, color video signal recording and reproducing systems are classified into (1) systems wherein the luminance signal and chrominance signal of a composite color video signal are recorded in and reproduced from separate tracks on a magnetic medium, and (2) systems wherein the color video signal is frequency modulated for recording and reproducing.

The first system, however, has an essential disadvantage. It uses twice as much magnetic medium as that required by other systems in which the luminance and chrominance signals are recorded combinedly. The second system also has a disadvantage, when applied to a relatively simple type video tape recorder (hereinafter referred to as a "VTR" apparatus), because then it tends to cause a beat frequency which, in turn, cause moires and considerably degrade the quality of the reproduced pictures. When this second system is adapted for color TV broadcasting VTR apparatus, the so-called "high band system" is employed in an attempt to prevent the production of beats. The FM carrier wave used in this high band system has a higher frequency than that of the "low band system." In the simple type VTR for industrial or household use, however, the relative speed between the magnetic tape and the magnetic head is lower than in the VTR for commercial broadcasting use. Nor can the frequency of the FM carrier wave be made into a sufficiently high frequency. When the second system is adapted for such simple type VTRs, therefore, excessive beats are often caused by the FM carrier wave and chrominance subscarrier.

The following factors are usually responsible for the production of beats. (1) There is a leaking of the frequency modulated component through the frequency modulator. (2) There is a leaking of the frequency modulated component through the frequency demodulator. (3) There is a folded spectrum in the second sideband with respect to the chrominance subcarrier. (4) There is a non-linear characteristic of the low carrier wave FM transmission system. Of these factors, the fourth factor is almost inevitable in a magnetic recording and reproducing system, being responsible for the beats almost inevitably produced during the process of operation of the magnetic tape. Thus, it is impossible to wholly eliminate the beats of this type. However, it is not impossible to eliminate the beats caused by the factors (1) to (3) since the result from low carrier wave frequency modulation of video signals comprising carrier chrominance signals.

The above described defects of the prior art systems are successfully overcome by the system of this invention, wherein, on its recording side, a luminance signal separated from a color video signal is frequency modulated. A carrier chrominance signal is frequency converted. The frequency modulated luminance signal and the frequency converted carrier chrominance signal are mixed or added together and recorded on a magnetic medium.

On a reproducing side, on the other hand, the phase of a burst signal separated from a reproduced carrier chrominance signal is compared with the phase of a reference signal having a stable frequency. The output from this phase comparison is used for controlling of the oscillation frequency of a voltage control oscillator. The output from this voltage control oscillator is fed back to a frequency converter adapted for converting the frequency of the reproduced carrier chrominance back to the original frequency band. This system eliminates variation that may be included in the time axis of the reproduced carrier chrominance signal.

In the reproducing side as described above, the phase comparison of the burst signal and the reference signal is made only during a burst period at each horizontal scanning period. The output resulting from the phase comparison is held for one horizontal scanning period (63.5 $\mu$sec). However, if a sample holding is repeated at an interval of one horizontal period, the control loop for the voltage control oscillator tends to be drawn to and locked at false stabilizing points which have frequencies of 3.58 MHz $\pm$ 15.75 KHz $\times$ $n$ (where $n$ is an integer). When the running speed of the magnetic tape used as a recording medium is different from its normal running speed, the frequency of the chrominance subcarrier which has been reproduced and re-frequency converted does not become exactly 3.58 MHz, but deviates from that value. If the deviation is more than 15.75 KHz, the control loop is locked at a frequency which is shifted from the 3.58 MHz point by a frequency which is 15.75 KHz multiplied by an integer. In this case, a color picture of a normal color cannot be reproduced.

It is, therefore, a general object of the present invention to provide a novel and useful color video signal recording and reproducing system which has solved the above described problems.

Another object of the invention is to provide a feedback loop for preventing the oscillator used for converting and restoring the carrier chrominance signal to its original frequency from being drawn and locked at a false stabilizing point.

According to the system of the invention, so-called the "color lock" is stably effected in the system. The apparatus can be constructed simply and inexpensively, as compared with a system using a pilot signal or a discriminator for discriminating a horizontal synchronizing signal. Further, the system according to the invention is stable against a tape noise, capable of obtaining a detection signal of a high signal to noise ratio, and has a good temperature characteristic.

A further object of the invention is to provide two control loops for preventing the oscillator used for frequency converting the reproduced carrier chrominance signal, to restore it to its original frequency. One of the two control loops controls the oscillation frequency of the oscillator by means of an error output which has been obtained by comparing the phase of a burst signal obtained from the carrier chrominance signal with that of a reference signal. The other control loop controls the oscillation of the oscillator by means of a detected error output, which has been obtained by detecting an error of the running speed of a recording medium.

Other objects and features of the invention will become apparent from the description made hereinbelow with reference to the accompanying drawings, in which.

Figure 1:
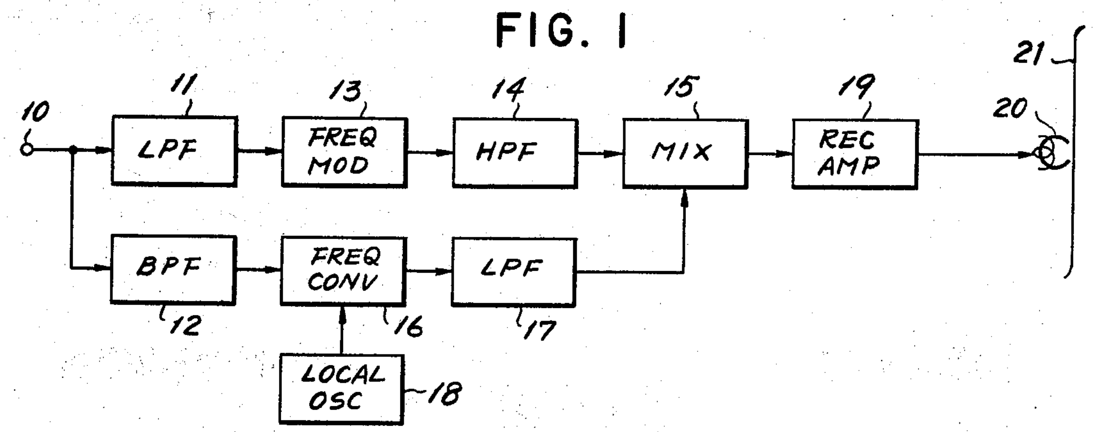
FIG. 1 is a block diagram of one embodiment of the recording side of the system according to the invention.

One preferred embodiment of the recording side of the color video signal recording and reproducing system, according to the invention, will now be described with reference to FIG. 1. An NTSC system color video signal is applied through an input terminal 10 to a low-pass filter 11 having an upper limit frequency of 3 MHz. The same input signal is also applied to a band-pass filter 12 which passes a frequency band of 3.1 to 4.1 MHz. A luminance signal, on the one hand, is separated from the color video signal at the low-pass filter 11 and is frequency modulated at a frequency modulator 13. The frequency deviation in this instance is selected to be in the range from about 3.8 to 5.4 MHz. The output from the frequency modulator 13 is applied to a high-pass filter 14, which removes therefrom the sidebands of less than about 1.2 MHz. The frequency modulated luminance signal is then applied to a mixer 15.

On the other hand, a carrier chrominance signal is separated from the incoming color video signal at the band-pass filter 12, and then applied to a frequency converter 16. The carrier chrominance signal with a frequency of 3.579545 MHz (hereinafter stated more simply as 3.58 MHz) is frequency converted by the output signal of a local oscillator 18 and is hence "beaten down." The local oscillator 18 may be a crystal oscillator. It supplies a frequency of a stable 4.267919 MHz (hereinafter stated more simply as 4.268 MHz). The signal which has been converted, at the frequency converter 16, to a difference frequency (i.e. about 688 KHz) between the aforesaid 4.268 MHz and 3.58 MHz frequencies is removed of its unnecessary components at a low-pass filter 17, having an upper limit frequency of 1.2 MHz. The frequency converted carrier chrominance signal is then applied to the mixer 15.

In this mixer 15, the frequency modulated luminance signal from the high-pass filter 14 and the frequency converted carrier chrominance signal from the low-pass filter 17 are mixed together or superimposed one upon the other, in such a manner that their bands will not overlap. The signal produced by this superposition is then amplified at a recording amplifier 19. Then it is applied, for example, to a rotary recording and reproducing magnetic head 20. The signal is thus recorded on a running magnetic tape 21 by the rotary magnetic head 20, in the conventional method. In this case, the carrier chrominance signal is recorded with its level being selected at about −20 dB, which is the level of the frequency modulated luminance signal.

A part of one embodiment of the reproducing side of the system, according to the invention, will now be described with reference to FIG. 2.

A signal, is reproduced by a reproducing magnetic head 30 from the running magnetic tape 21. Then it is amplified in a reproducing amplifier 31 and supplied to a high-pass filter 32 having a lower limit frequency of 1.2 MHz and also to a low-pass filter 37 having an upper limit frequency of 1.2 MHz.

The frequency modulated luminance signal is separated in the high-pass filter 32 and supplied to a limiter 33 where it is amplitude limited. Then, the frequency modulated signal is demodulated in a frequency demodulator 34. The frequency modulating carrier component is removed in a low-pass filter 35 having an upper limit frequency of 3 MHz. Only the luminance signal component is in the output from the low-pass filter 35, which is supplied to a mixer 36.

In the meanwhile, the carrier chrominance signal separated in the low-pass filter 37 is supplied to a frequency converter 38 where it is frequency converted responsive to an output frequency of 4.268 MHz from a voltage control oscillator 39. Thereby, the carrier chrominance signal is "beaten up" and restored to the frequency of the original carrier chrominance, signal having a frequency of 3.58 MHz. The output carrier chrominance signal is heterodyned and stabilized in the frequency converter 38. Then it is supplied to a band-pass filter 40, which passes a frequency band of 3.1 to 4.1 MHz and removes unnecessary components from the signal. Then the signal is supplied to the mixer 36 and a burst gate circuit 41. In the mixer 36, the luminance signal from the low-pass filter 35 and the carrier chrominance signal from the low-pass filter 40 are mixed to provide a reproduced NTSC color video signal from an output terminal 47.

A part of the output of the mixer 36 is supplied to a synchronizing signal separator 42 where the horizontal synchronizing signal is separated. A gate pulse is formed of the horizontal synchronizing signal thus separated in the synchronizing signal separator 42 and applied to the burst gate circuit 41. Responsive to this gate pulse, the burst gate circuit 41 separates the color burst signal from the carrier chrominance signal which is supplied from the band-pass filter 40. The color burst signal is then supplied to a phase comparator 44, where it is compared in phase with the stabilized output frequency of 3.58 MHz from a reference chrominance subcarrier frequency oscillator 43, comprising of a crystal oscillator. The phase error output of the phase comparator 44 exists only during the burst period. Accordingly, the phase error output is supplied to a one horizontal scanning period holding circuit 45 where it is held during one horizontal scanning period and made into a voltage change with an interval of 63.5 μsec. This voltage change is applied to the voltage control oscillator 39 for controlling the oscillating frequency of the oscillator. In the above described reproducing side, the closed loop starting from the frequency converter 38, through the band-pass filter 40, the burst gate circuit 41, the phase comparator 44, the one horizontal scanning period holding circuit 45 and the voltage control oscillator 39, and returning to the frequency converter 38, constitutes an automatic phase control (APC) loop.

In the above described reproducing side, a phase comparison is effected only during the burst period at each one horizontal scanning period in the phase comparator 44. The holding of the output of the phase comparator 44 is made in the holding circuit 45 with an interval of 63.5 $\mu$sec. Since the sample holding is repeated with an interval of 63.5 $\mu$sec, the stabilizing point of the control loop exists at a frequency of 3.58 MHz $\pm (1/(63.5 \times 10^{-6})) \times n$ (where $n$ is a positive or negative integer including zero). Centering is at 3.58 MHz, since the reference frequency to be compared in phase in the phase comparator 44 is 3.58 MHz. However, stabilizing points (other than one where $n$ is zero) are all false stabilizing points caused by the fact that the phase comparison is made at an interval of 63.5 $\mu$sec, so that these stabilizing points other than 3.58 MHz are unnecessary.

If the running speed of the tape changes during recording and reproducing operations on the magnetic tape, an error occurs relative to a normal running speed. The frequency of the reproduced and re-frequency converted chrominance subcarrier does not become exactly 3.58 MHz but deviates from that value. If the amount of deviation is more than $(1/63.5 \times 10^{-6})$ Hz, i.e. 15.75 KHz, the control loop will be drawn to a false stabilizing point which occurs at frequencies other than where $n$ is zero, and it will be locked at that false stabilizing point. In this case, the control loop will be fixed at a frequency which is shifted from the 3.58 MHz point by $\pm$ 15.75 KHz multiplied by the integer ($n$). A color picture of a normal color will not be reproduced.

To prevent the control loop from being drawn to this false stabilizing point, it is easily conceivable to provide a discriminator which converts a change in the horizontal synchronizing signal frequency into a voltage change. The change is fed back its output to the voltage control oscillator 39. This method is disadvantageous in that it requires and additional circuit which constitutes the discriminator. There is much drift due to temperature in the circuit itself, and the operation is unstable due to noises generated from the magnetic tape, caused by drop-out and other factors. Furthermore, this method cannot be adopted for a simple type VTR.

This invention provided a new reproducing system in which the control loop is not locked at a false stabilizing point (as described above) on the reproducing side.

Figure 3:
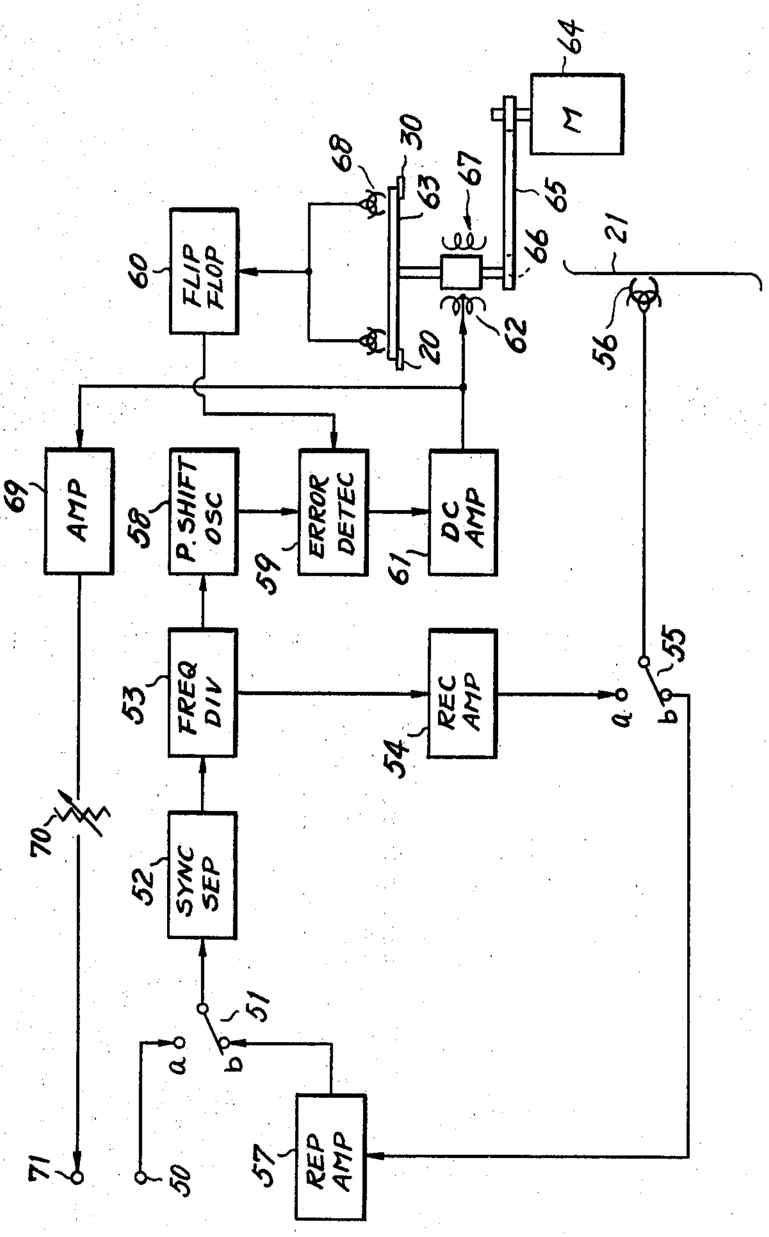
FIG. 3 is a block diagram showing one embodiment of a tape running speed error detection system which constitutes an essential part of the system according to the invention.

FIG. 3 shows a block diagram of an essential part of one embodiment of the system, according to the invention, which is applicable to the foregoing reproducing side. During recording, a video signal, which is a part of the video signal to be applied to the terminal 10, is applied to an input terminal 50. The video signal is supplied to a synchronizing signal separator 52 through a switch 51, which is resting on a contact a. The horizontal synchronizing signal is separated from the video signal in the synchronizing signal separator 52. The horizontal synchronizing signal thus separated is frequency divided at a one-half frequency divider 53 and thereafter is amplified at a control signal recording amplifier 54. The amplified signal is supplied through a switch 55 resting on contact a to a stationary magnetic head 56. The magnetic head 56 then records the signal, as a control signal, in a track formed in a longitudinal direction along the edge of the magnetic tape 21.

During reproduction, the control signal is reproduced by the magnetic head 56 from the magnetic tape 21. The control signal is supplied, through the switch 55 (which is now switched and resting on contact *b*) to a control signal reproducing amplifier 57 where it is amplified. The amplified reproduced control signal is supplied, through the switch 51 (which is now switched and resting on contact *b*) to the synchronizing signal separator 52, and the one-half frequency divider 53, to a phase shifting oscillator 58, as a signal of 30 Hz.

Figure 4:
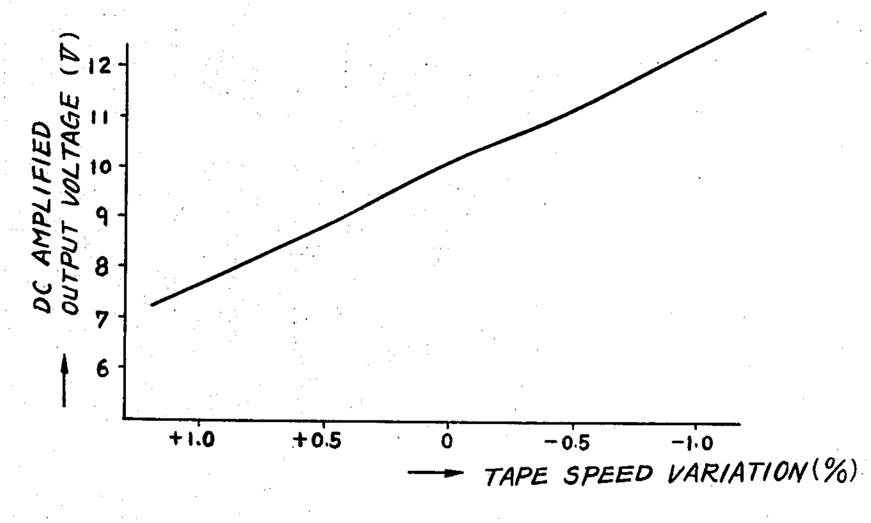
FIG. 4 is a diagram showing a relationship between the change in the tape running speed and the DC amplified output voltage of the detected error.

The output signal of the one-half frequency divider 53 drives the phase shifting oscillator 58. The output of the oscillator 58 is supplied to an error detection circuit 59, as a sample pulse. The output of a flip-flop circuit 60 is applied to the error detection circuit 59 where it is sampled by the sample pulse from the oscillator 58. The detected error output of the error detection circuit 59 is amplified in a DC amplifier 61 and thereafter supplied, on the one hand, to a brake coil 62 as a brake current. The frequency of the reproduced control signal is changed responsive to the change of the running speed of the magnetic tape 21. The relationship between the change of the running speed of the tape 21 (percent) and the DC amplified output voltage (V) is substantially linear as shown in FIG. 4. Accordingly, a brake force is produced by the brake coil 62, which force varies linearly with the running speed of the magnetic tape.

A rotary head plate 63 carries the above described rotary magnetic head 20 or the rotary reproducing magnetic head 30. Plate 63 is rotated by a rotational force transmitted from a synchronous motor 64 through a belt 65 and a pulley 66. The rotary speed of the head plate 63 is controlled in accordance with the braking force produced in the brake coil 62 of the braking mechanism. Accordingly, the rotation of the rotary head plate 63 is controlled by the output of the error detection circuit 59.

The number of rotations per unit of time of the rotary head plate 63 is detected by a pickup coil 68 which co-operates with a magnet (not shown) provided on the plate 63. The rotational speed detection device employing the pickup coil 68 and the magnet may be a conventional one. The output of the pickup coil 68 is applied to the flip-flop circuit 60 as a timing pulse which drives the circuit 60. The output of the flip-flop circuit 60 is supplied to the error detection circuit 59 as a sample pulse, as described above. Accordingly, the rotational speed of the rotary head plate 63 is controlled responsive to the change of the running speed of the magnetic tape 21. The speed control is carried out by means of the control signal reproduced as a function of the running magnetic tape 21 and the pulse obtained in accordance with the rotation of the rotary head plate 63.

The change in the frequency of the chrominance subcarrier is in linear proportion to the change in the running speed of the tape. Therefore, sampling is effected in the error detection circuit 59 and the error output obtained by amplification in the DC amplifier 61 is applied to the brake coil 62 as well as to the amplifier 69, where it is amplified again. The output of the amplifier 69 is properly adjusted in its polarity and level by a polarity and level adjuster 70 and thereafter is obtained from a control voltage output terminal 71 as a control voltage.

Figure 2:
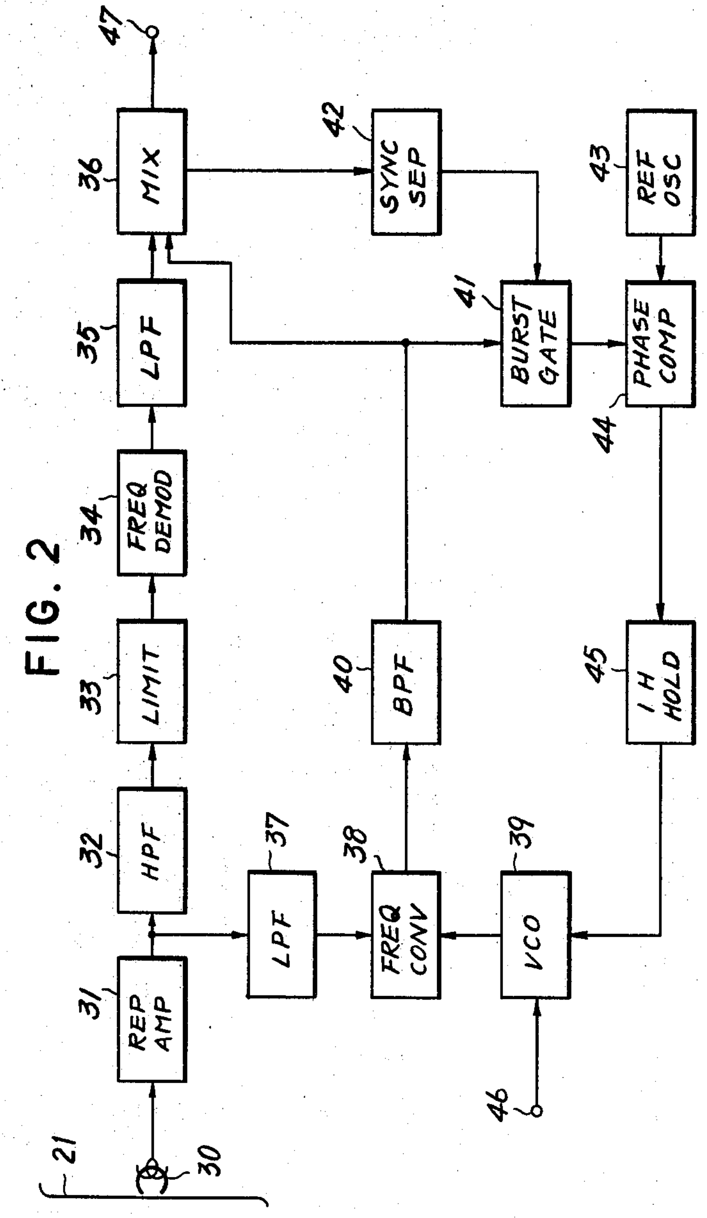
FIG. 2 is a block diagram of a part of one embodiment of the reproducing side of the system according to the invention.

The control voltage obtained from the output terminal 71 shown in FIG. 3 is applied to a control voltage input terminal 46 for the voltage control oscillator 39 shown in FIG. 2. The oscillating frequency of the voltage control oscillator 39 is controlled by this control voltage from the control voltage input terminal 46 as well as by the output voltage of the one horizontal scanning period holding circuit 45.

The foregoing control system prevents the loop including the voltage control oscillator 39 from being drawn to and locked at a false stabilizing point of the chrominance subcarrier due to the error in the running speed of the magnetic tape 21.

Further, this invention is not limited to these embodiments but various variations and modifications may be made. Therefore the claims are to be construed to cover all equivalent structures which do not depart from the scope and spirit of the invention.

What I claim is:

1. A system for recording and reproducing a color video signal on a running recording medium comprising first filter means for separating a luminance signal from a color video signal, means for frequency modulating said luminance signal separated by said first filter means, second filter means for separating a carrier chrominance signal from said color video signal at each horizontal scanning period, first frequency converting means responsive to a reference signal for converting the separated frequency band of said carrier chrominance signal to a frequency band which is lower than said frequency band of the carrier chrominance signal, means for superimposing the output of said frequency modulating means and the output of said frequency converting means one upon the other, means comprising a rotary magnetic head for recording said superimposed signal on and reproducing it from said running recording medium, third filter means for separating a frequency modulated luminance signal from a signal reproduced by said recording and reproducing means, means for demodulating said separated luminance signal, fourth filter means for separating the frequency converted carrier chrominance signal from said signal reproduced by said recording and reproducing means, second frequency converting means for frequency converting and restoring the frequency band of said carrier chrominance signal filtered by said fourth filter means to the original frequency band, means for obtaining a reproduced color video signal by mixing the output of said demodulating means and the output of said second frequency converting means, means for separating a color burst signal from the output signal of said second frequency converting means, oscillating means for producing a reference subcarrier frequency signal, means for comparing the phase of said color burst signal with the phase of the output signal of said oscillating means, voltage control oscillator means having a center frequency of oscillation which is controlled responsive to the output of said phase comparing means for supplying its output to said second frequency converting means, error detecting means operated responsive to the detection of an error in the running speed of said recording medium and for supplying the detected error output to said voltage control oscillator, means for forming a feedback loop including said second converting means, said color burst separating means, said phase comparing means, and said error detecting means, for controlling said voltage control oscillator, and means for preventing said feedback loop including said voltage control oscillator from being drawn to and locked at a false stabilizing point which is deviated from the frequency of the chrominance subcarrier by a frequency which is equal to a frequency of the horizontal synchronizing signal multiplied by an integer.

2. The color video signal recording and reproducing system as defined in claim 1 which further comprises holding means for holding the output of said phase comparing means during each one horizontal scanning period, and means wherein said phase comparing means compares the phases only during a burst period.

3. The color video signal recording and reproducing system as defined in claim 1 which further comprises means for recording a control signal on and reproducing it from said recording medium, said error detecting means comprising means for obtaining a signal in response to the rotation of said rotary magnetic head, detector means for detecting an error between the signal obtained in response to the rotation of said rotary magnetic head and the reproduced control signal, and means for supplying the detected output of said detector means to said voltage control oscillator.

4. The color video signal recording and reproducing system as defined in claim 3 which further comprises means for controlling the rotation of said rotary magnetic head responsive to the detected output of said detector means.

5. The color video signal recording and reproducing system as defined in claim 1 which further comprises means for recording a control signal on and reproducing it from said recording medium, means comprising a rotary member carrying said rotary magnetic head, means for rotating and driving said rotary member, said error detecting means comprising means for obtaining a rotation signal in response to the rotation of said rotary member, flip-flop circuit means driven by said rotation signal, oscillator means for generating an oscillating signal in response to the control signal reproduced by said control signal recording and reproducing means, detector means for comparing the phase of the oscillating output of said oscillator and the phase of the output of said flip-flop circuit and producing an error output, means for controlling the rotation of the rotary member by applying a braking force thereto responsive to the output of said detector means, and means for supplying the output of said detector means to said voltage control oscillator.

6. The color video signal recording and reproducing system as defined in claim 1 wherein the detected error output of said detector means varies substantially linearly with the running speed of said recording medium.

7. A magnetic recorder for a color video signal comprising color lock means for restoring color to a signal reproduced by said recorder, oscillator means for locking said signals into said restored color phase, means for precluding said oscillator from locking into a false stability displaced from the normal color lock frequency, a running medium, said color lock means comprising a feedback loop including said oscillator means, and said means for precluding false stability locking comprising means being responsive jointly to a phase differential between a color burst signal and a reference oscillator output and to an error in the running speed of said medium.

8. A color video signal recording and reproducing system comprising means for modulating a luminance signal in a color video signal, means for frequency converting a carrier chrominance signal of the color video signal, means for superposing one of said signals upon the other of said signals, means for recording the superposed signals on a magnetic medium, means for reproducing the recorded signals, transport means for moving said magnetic medium, oscillator means for oscillating a signal for converting the carrier chrominance signal of the reproduced signals back into a signal having the original frequency, and means for controlling the frequency of the signal generated by said oscillator means responsive jointly to a phase differential between a color burst signal and a reference oscillator output, and to an error in the relative running speed of said transport means.

* * * * *